United States Patent

[11] 3,568,708

[72] Inventor Robert B. Ashman
 St. Louis, Mo.
[21] Appl. No. 841,945
[22] Filed July 15, 1969
[45] Patented Mar. 9, 1971
[73] Assignee Scovill Manufacturing Company
 Waterbury, Conn.

[54] TIRE VALVE CORE
 5 Claims, 3 Drawing Figs.

[52] U.S. Cl. .................................................. 137/234.5,
 137/543.23, 152/427
[51] Int. Cl. .................................................... F16k 15/20
[50] Field of Search ............................................ 137/234.5;
 152/427

[56] References Cited
 UNITED STATES PATENTS

| | | | |
|---|---|---|---|
| 632,218 | 8/1899 | Goss | 137/234.5X |
| 669,414 | 3/1901 | Hilton | 137/234.5 |
| 3,207,172 | 9/1965 | Steer | 137/234.5 |
| 3,310,064 | 3/1967 | Voos | 137/234.5 |

*Primary Examiner*—Harold W. Weakley
*Attorney*—Dallett Hoopes

ABSTRACT: A tire valve core which has a two-piece plastic body wherein the parts interfit in snap engagement. Seal in tire stem is assured as the tapered plastic side of the body wedges against the stem shoulder.

PATENTED MAR 9 1971

3,568,708

INVENTOR.
Robert B. Ashman
BY Dallett Hoopes
ATTORNEY.

TIRE VALVE CORE

This invention relates to a tire valve core. More specifically, this invention relates to a valve core of unusually simple construction and ease of manufacture and which is adapted to be used with the conventional tire stem housing.

The prior art is replete with showings of tire valve cores of different descriptions. Many of these screw into an internally threaded tire stem housing and include sealing means and self-contained means for urging the valve element toward the closed position. An example is the structure shown in the Briechle U.S. Pat. No. 2,862,515. In this meritorious structure, the valve seat is disposed centrally of the core and the lower part of the core houses and retains a spring which urges the valve element toward the seat. The valve is assembled by inserting the valve element and spring into the housing and then crimping shut the lower end of the housing to hold the spring. External resilient sealing means encircle the metal valve body.

The present invention may be regarded as an improvement over the aforementioned Briechle patent retaining the advantages of the effective Briechle structure by simplified construction and reducing the number of parts. In its assembly, no deforming of metal body parts is involved.

Further objects of the invention will be apparent from a review of the following specification including the drawings wherein.

Figure 1:
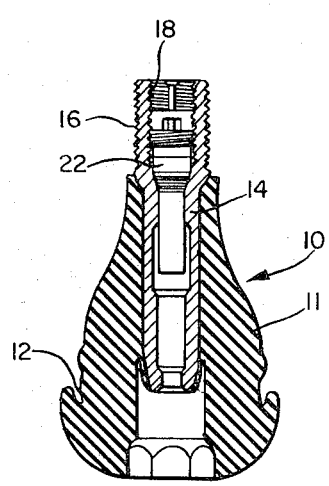
FIG. 1 is a sectional view of a snap-in tire valve having a core embodying the invention.

Referring more specifically to the invention, a snap-in tire valve having a core embodying the invention is generally designated 10 in FIG. 1. This valve may be of the general type disclosed in U.S. Pat. No. 2,862,539. It is provided about its rubber base 11 with a circumferential groove 12 adapted to fit in snap engagement into the rim hole opening of the tire. A metal insert 14 is bonded to the rubber base 11. The upper end of the insert 14 is exteriorly threaded as at 16 to receive a protective dust cap and the inside of the stem is threaded as at 18 to receive as shown the tire valve core 20. The inclined shoulder 22 is spaced down from the threaded section 18 for reasons which will appear.

Figure 2:
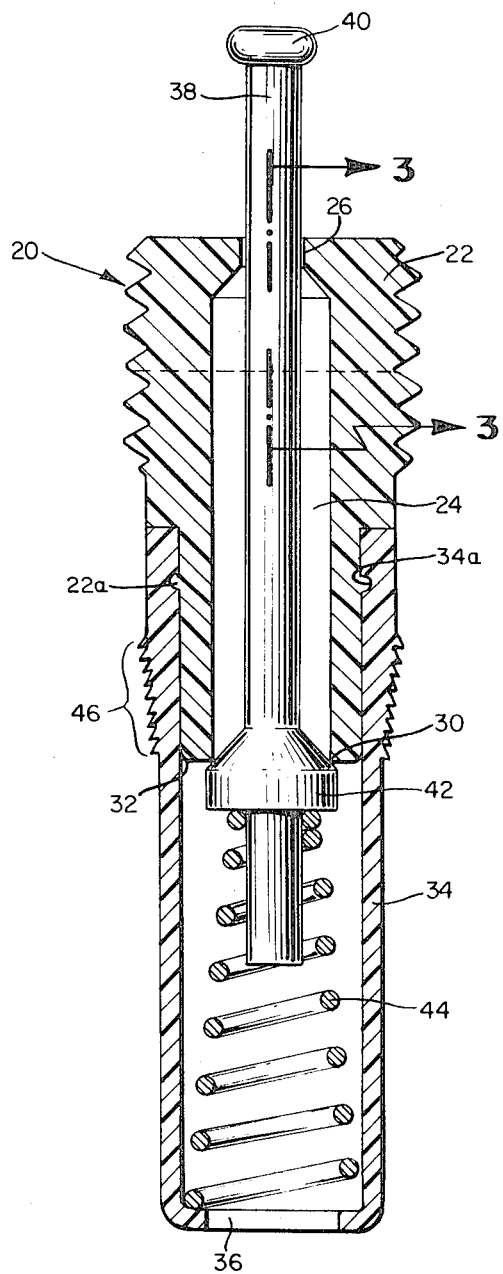
FIG. 2 is an enlarged sectional view of a core embodying the invention.
Figure 3:
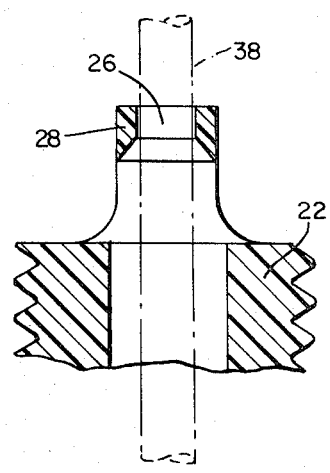
FIG. 3 is a fragmentary sectional view taken on the line 3-3 of FIG. 2.

The core 20 (FIG. 2) comprises a valve body 22 of plastic having an axial passage 24 which is reduced at its upper end to form a pin retaining opening 26. As is conventional, the upper end of the body is formed with a bridge 28 which serves as a means to engage the core with an installation tool.

The core end of the body is formed with a central opening 30, the edge of which forms a downwardly facing seat. The margin of the lower end is rounded as at 32 to facilitate assembly.

A spring retainer cup 34 comprises the lower portion of the core. It is formed with a central opening 36 in its bottom wall. The body 22 fits snugly into the mouth of the retainer cup 34. In the preferred embodiment, the inside of the mouth of the cup is formed with a circumferential groove 34a and the adjacent portion of the body is formed with an outward circumferential rib 22a so that in installation there is a snap engagement of the rib and groove together to hold the two parts in tight sealing assembly. Also in the preferred version, the diameter of the body is reduced where it engages the mouth of the cup 34 and the outer diameter of the cup where the cup is adjacent the body is the same as the outer diameter of the body to afford a clean appearance and operation.

A valve pin 38 is headed at its upper end 40 and extends down through the opening 26. Bonded to the pin below the lower end of the body is a resilient valve flange 42 which may have a tapered upward surface to assist centering of the valve on the seat 30. An axial spring 44 is disposed in compression in the cup 34 and its upper end engages under the flange 42 and surrounds the lower end of the pin. The bottom of the spring 44 engages the bottom wall of the cup surrounding the opening 36.

The retaining cup 34 is formed with a tapered section 46 which in installation in a housing insert 14 sealingly engages the tapered shoulder of the insert to form an airtight seal. Because the cup 34 is of resilient material, there is no need for any special sealing gasket and thus the number of parts required in the assembly is reduced.

The assembly of a core embodying the invention is simple: The pin 38 having the resilient flange 42 bonded thereto about an annular enlargement (not shown) is inserted up through the seat 30 and opening 26 as shown and it is subsequently headed as at 40 to keep it in the body thereafter and provide a broader surface for depression. Next, the retainer cup 34 enclosing the spring 44 is brought up over the pin so that the upper end of the spring 44 surrounds the lower end of the pin. The mouth of the cup 34 is then brought over the lower end of the body and shoved home to the point where the rib 22a and groove 34a interfit in snap engagement. Being thus assembled in a simple foolproof way, the core may then be screwed into the valve stem shown in FIG. 1.

If desired or necessary, the tapered section 46 may be formed with an outer surface having a saw-toothed profile (as shown). This is disclosed on the plug gasket in U.S. Pat. No. 2,932,531. Such a configuration enhances the sealing of the core within the valve housing.

While the structure shown is preferred, further variations within the scope of the invention are possible. If desirable or necessary, the body portion of the core 20 can be made of metal without altering the configuration of the parts, and still produce a product which has many of the advantages described above. In making the body 22 of metal, additional strength is afforded the bridge structure 28 to withstand the high torque of core tightening.

The patentable invention in the above disclosure is described in the following claim language:

I claim:

1. A tire valve core comprising:
   a. a valve body of plastic having an axial passage therethrough and with a threaded portion in its outer wall to be screwed into a valve stem, the body presenting a downwardly facing seat surrounding the lower end of the passage;
   b. a spring retainer cup of plastic having an open upper end and central opening in its bottom wall, the body fitting snugly into the mouth of the retainer cup, the outer surface of the body engaging the inner surface of the cup, one of the surfaces being formed with a circumferential groove and the other with a circumferential rib interfitting in snap engagement in the groove to provide a tight swivel connection between the cup and the body;
   c. a valve pin extending down freely through said passage and into the cup and having a resilient valve flange bonded to the pin below the bottom of the body to serve as the valve element; and
   d. an axial spring disposed in compression in the cup with its upper end engaging under the flange and surrounding the pin to bias the valve element closed against the seat, the lower end of the spring engaging the bottom wall of the cup surrounding the opening.

2. A valve core as described in claim 1 wherein the lower end of the body is of reduced outer diameter where it is surrounded by the upper end of the cup and the external diameter of the body and cup where they meet are the same.

3. A valve core as described in claim 1 wherein the exterior of the core is formed with a circumferentially tapered portion which, in insertion into a valve housing, engages a shoulder in such housing, wedging thereagainst to form a seal.

4. A valve core as described in claim 1 wherein the lower end of the body is formed with rounded edges.

5. A valve core as described in claim 3 wherein the tapered bushing is formed with a series of spaced annular ridges giving it a saw-toothed profile.